United States Patent Office 2,915,916
Patented Dec. 8, 1959

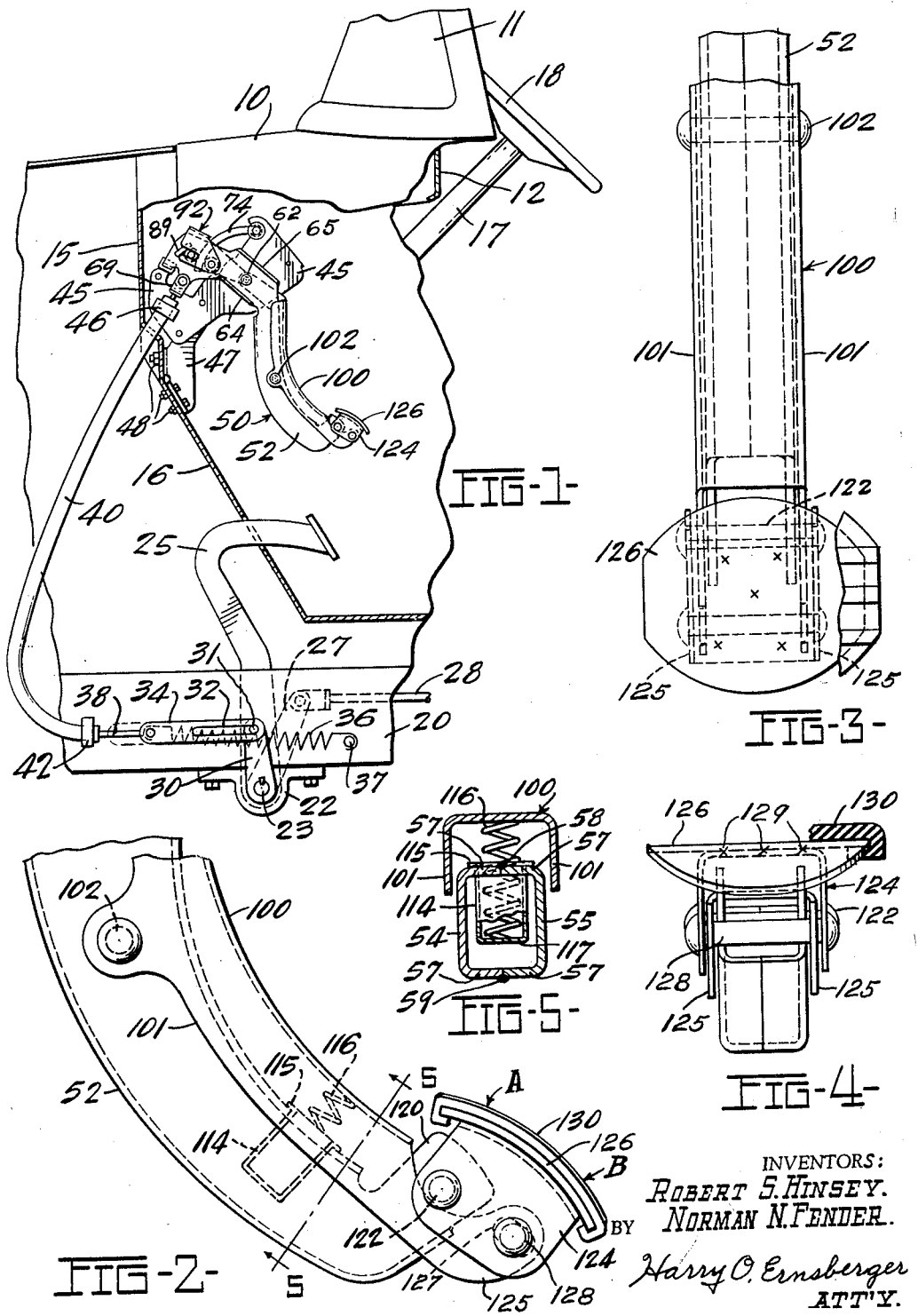

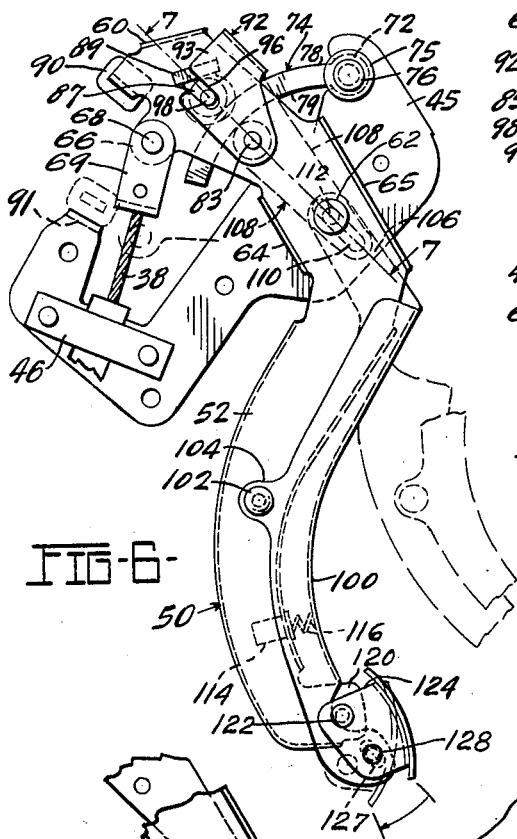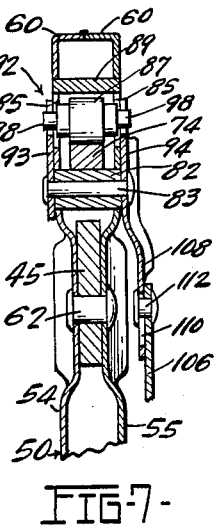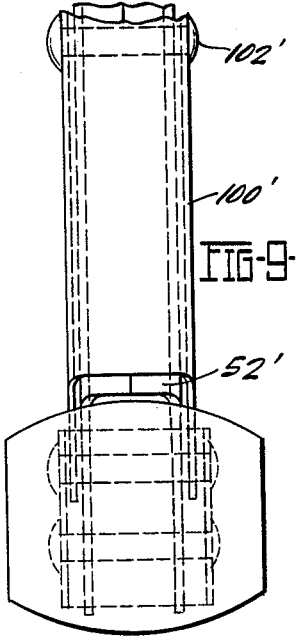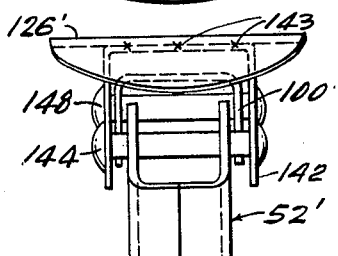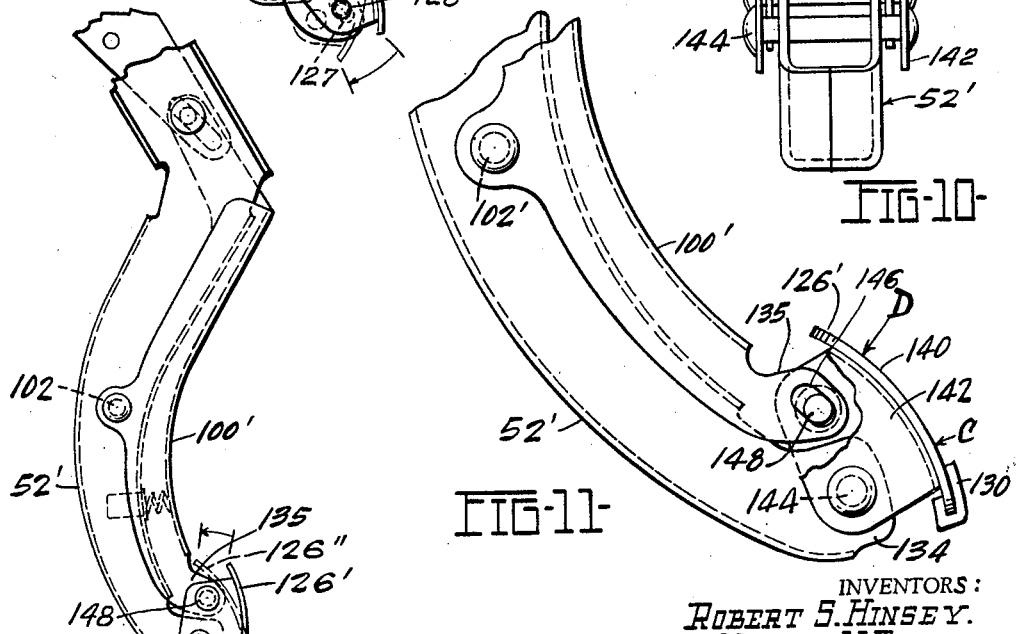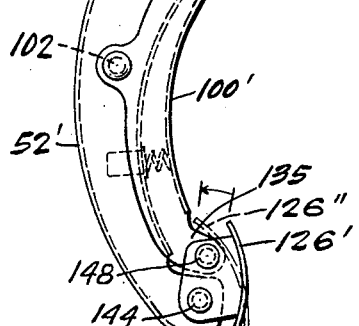

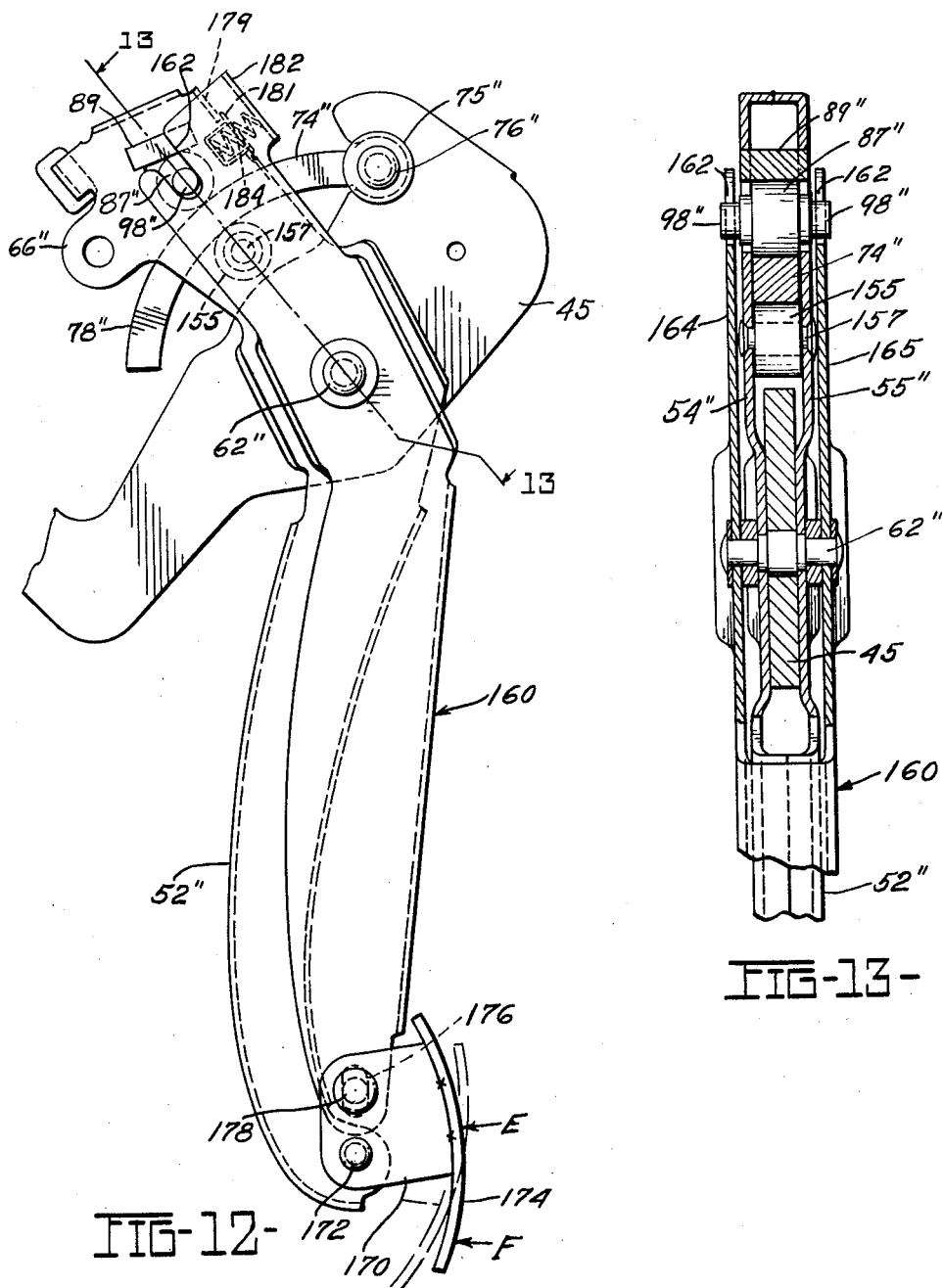

2,915,916

FOOT ACTUATED MECHANISM CONTROL

Robert S. Hinsey, Toledo, Ohio, and Norman N. Fender, Erie, Mich., assignors to The Bingham-Herbrand Corporation, Toledo, Ohio, a corporation of Ohio Application July 31, 1957, Serial No. 675,483

7 Claims. (Cl. 74—531)

This invention relates to mechanism controls and more particularly to foot controlled mechanism or apparatus for actuating the parking or emergency brakes of a vehicle.

The present invention embraces the provision of a lever mechanism or lever construction associated with means effective for holding or retaining the lever mechanism or lever construction in adjusted or brake setting positions and wherein the lever mechanism is actuated to brake setting positions and the lever holding or lever retaining means released or controlled by a single foot-operated member.

The invention has for an object the provision of a foot-operated brake actuating lever embodying a lever retaining or clutch device for retaining or holding the lever in various positions of adjustment in conjunction with a releasing means for the lever retaining means carried by the lever wherein a relatively movable member associated with both the lever and the lever releasing means is arranged to be actuated by the operator for performing the functions of setting the brake mechanism and releasing the same.

Another object of the invention is the provision of a foot-operated lever adapted to actuate or control the parking or emergency brakes of a vehicle, the arrangement incorporating a clutch means for retaining the lever in various brake setting positions and a release means for the clutch means, and wherein a single foot-operated member is articularly connected with the lever and cooperatively associated with the lever retaining means whereby the lever may be moved to brake setting positions and released through foot pressure applied in a proper direction to the single member.

Another object of the invention resides in the provision of a foot-operated lever in combination with means for retaining the lever in adjusted position wherein a foot pad member articulately mounted on the lever and capable of tilting movement with respect thereto is articulately connected with a lever releasing means in a manner whereby foot pressure applied in one direction to the member is effective to move the lever to brake setting position and wherein pressure applied in another direction to the foot pad member actuates a lever releasing means for returning the lever to a normal or brake-release position.

A further object of the invention is the provision of a lever construction and a lever retaining means therefor in combination with a single foot-operated element articulately connected to the lever and a component of the lever retaining means whereby actuation of the lever to mechanism control position and releasing movement of the lever retaining means is affected through foot operation of the single member.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view partly in section illustrating a portion of the operator's compartment of a vehicle and an installation of a form of mechanism control of the invention therein;

Figure 2 is a side elevational view of the lower portion of the lever construction embodying a form of lever releasing means of the invention;

Figure 3 is a front elevational view of the portion of the construction illustrated in Figure 2;

Figure 4 is an end elevational view of the arrangement shown in Figure 3;

Figure 5 is a detail sectional view taken substantially on the line 5—5 of Figure 2;

Figure 6 is a side elevational view of the lever construction shown in Figures 1 and 2 showing the lever and retaining means therefor in brake-setting position;

Figure 7 is a fragmentary sectional view taken substantially on the line 7—7 of Figure 6;

Figure 8 is an elevational view of a lever construction and releasing means therefor showing another form of foot-operated brake setting and releasing means;

Figure 9 is an elevational view of the arrangement shown in Figure 8;

Figure 10 is an end elevational view of the lower portion of the construction shown in Figure 9;

Figure 11 is a side elevational view illustrating the articulate mounting of the foot actuated control member.

Figure 12 illustrates a modified form of control for the lever retaining means, and Figure 13 is a sectional view taken substantially on the line 13—13 of Figure 12.

While the mechanism control of the invention is illustrated as incorporated in the operator's compartment of a vehicle and utilized for actuating or controlling the parking or emergency brakes, it is to be understood that the arrangement of the invention may be utilized with other mechanisms wherever the same may be found to have utility.

Referring to the drawings in detail, and initially to the form of the invention shown in Figures 1 through 7, Figure 1 illustrates the operator's compartment of a vehicle in which is embodied a form of lever construction of the invention. The portion of the vehicle illustrated includes a cowl 10, a windshield 11, an instrument panel 12, a firewall or dashboard 15, a toeboard 16, and a steering post 17 upon which is supported a steering wheel 18. The vehicle includes a chassis frame construction embodying longitudinally extending side sills or frame members, one of which is shown at 20 in Figure 1, the frame members being spaced transversely of the vehicle.

Secured to the vehicle frame members 20 are bearing brackets 22 which journally support a transversely extending shaft 23. A service brake pedal construction 25 of conventional character is supported upon the shaft 23 and is adapted to normally actuate the service brakes of the vehicle (not shown). Service brakes are usually actuated by hydraulic means and an actuating member (not shown) for the hydraulic means may be connected with the service brake pedal construction 25.

Secured upon the shaft 23 is an arm 27 connected by means of a rod 28 or other suitable means with emergency or parking brake mechanism usually operative upon the rear road wheels (not shown) of the vehicle. When the shaft 23 is rotated in a counterclockwise direction as viewed in Figure 1, the rod 28 is moved in a left-hand direction to effect a setting of the parking or emergency brake mechanism.

Secured upon the shaft 23 is a member or arm 30, the distal end of which is equipped with a transversely extending pin or stub shaft 31 arranged for traverse in a slot 32 formed in an elongated member or link 34. The link 34 is normally biased toward brake release position under the influence of a contractile spring 36, one end of which is connected with the link 34 and the other end anchored to the frame member 20 by means of a pin 37. One end of a flexible cable 38 is secured to the link 34, the cable 38 being arranged for slidable movement within a sheath or tubular enclosure 40, the lower end of which may be secured to the frame member 20 by means of a clamp 42 as shown in Figure 1.

The sheath 40 extends upwardly through an opening in the dashboard or firewall 15 and is secured to a support 45 by a clamping member 46. The support 45 is carried by a bracket 47 which may be secured to the firewall 15 by bolts 48 or other securing means. The pin and slot arrangement, 31, 32 provides a lost motion connection between the link 34 and the arm 30 whereby movement of the service pedal construction 25 may be had without effecting relative movement of the link 34.

As particulalry shown in Figures 1, 6 and 7, the lever or lever construction 50 is articulately mounted or pivotally fulcrumed on the support 45. The lever construction 50 includes a lever body 52 preferably formed of mating sections or components 54 and 55 of generally U-shape in cross section, the inwardly projecting flanges or leg portions 57 thereof being in abutting relation and preferably welded along the juncture lines or regions 58 and 59 as shown in Figure 5.

The upper extremities of the sections or components 54 and 55 of the lever body are formed with abutting flanges 60 which are welded together in the same manner as the flanges 57. The lever or lever construction 50 is pivotally fulcrumed upon a rivet or stub shaft 62 which extends through aligned openings in the support 45 and the lever body components 54 and 55. The portions of lever components 54 and 55 adjacent the fulcrum or shaft 62 are formed with outwardly extending or outwardly turned flanges 64 and 65 in order to impart strength and rigidity to this portion of the lever construction.

The upper portions of the components 54 and 55 are formed with projections 66 having aligned openings to receive a pin or shaft 68 which joins a clevis 69 to the lever or lever construction 50. The upper end of the flexible cable 38 is secured to the clevis 69 in any suitable manner so that movement of the lever construction 50 about the fulcrum 62 in a clockwise direction as viewed in Figures 1 and 6 exerts a pull on the cable 38 to apply or set the parking or emergency brakes of the vehicle.

The lever arrangement 50 is equipped with a means or clutch mechanism for retaining the lever in adjusted or brake setting positions. As particularly shown in Figures 1 and 6, the support or member 45 is formed with an opening to snugly receive an enlarged circularly shaped end portion 72 of a curved or arcuately shaped bar or member 74. The entrance or throat of the opening in the support 45 which receives the circular portion 72 is restricted so as to prevent dislodgement of the bar 74 from the support 45. The bar is held against lateral displacement by means of washers 75 disposed on the opposite sides of the support, one of the washers being shown in Figure 6, the washers being held in place by means of a rivet 76 passing through openings in the washers and an opening in the head 72 of the bar.

The upper and lower surfaces 78 and 79 of the bar 74 are generated as radii about the axis of the fulcrum or shaft 62 of the lever 50. As shown in Figure 7, the walls 54 and 55 of the lever sections are provided with openings which accommodate a cylindrical sleeve or bushing 82 journally supported upon a rivet or stub shaft 83. The sleeve 82 provides an abutment contacting the inner arcuate surface 79 of the bar 74.

The opposed walls of lever sections 54 and 55 are formed with openings 85 to accommodate a lever retaining means, clutch member or roller 87. The lever retaining member or roller 87 is arranged for cooperative or locking engagement with the arcuate upper surface 78 of the bar 74.

The upper end regions of the sections 54 and 55 of the lever are formed with aligned rectangularly-shaped openings to receive a rectangularly-shaped block or clutch member 89 which is angularly arranged with respect to the arcuate or curved surface 78 of the bar 74 so as to provide therewith generally convergent surfaces between which is disposed the clutch member or roller 87. The lower surface of the block 89 and the curved surface 78 of bar 74 form a wedging angle to frictionally hold or lock the clutch roller 87 and thereby retain the lever construction 50 in adjusted or brake setting positions.

The block 89 and bar 74 are preferably hardened to minimize wear and the block 89 is welded to the lever sections 54 and 55 to maintain the same in position. The particular mounting of the bar 74 in the opening in the support 45 facilitates slight movement of the arcuate bar about the axis of the opening to compensate for inaccuracies of manufacture so as to establish a proper clutching engagement of the roller 87 with the bar 74 and the block 89 in order to effectively secure a locking engagement to hold the lever in brake setting positions.

Means are provided for controlling the lever retaining means or clutch 87 to normally bias the clutch member toward clutching position and to effect a release of the clutch to release the brake mechanism. As shown in Figures 1, 6 and 7, a member 92 is formed with a U-shaped portion, the walls 93 and 94 thereof straddling the upper region of the lever 50. The walls 93 and 94 are formed with openings to accommodate the rivet or stub shaft 83 whereby the member 92 is pivotally supported upon the lever construction for relative movement about the axis of the rivet 83.

The walls 93 and 94 of member 92 are formed with open ended slots 96, the edge walls defining the slots being parallel and spaced to snugly, yet slidably and rotatably, accommodate tenons 98 formed on the clutch roller 87 as shown in Figures 6 and 7. Thus pivotal movement of the clutch controlling member 92 about the axis of the rivet 83 moves the clutch 87 into effective or ineffective positions.

A motion translating member or supplemental lever 100 for actuating the clutch control means 92 is pivotally supported upon the lever body 52 by means of a rivet or stub shaft 102 extending through aligned openings formed in projections 104 formed as extensions of the parallel walls of the U-shaped member 100 as particularly shown in Figures 2 and 6. The U-shaped configuration of member 100 straddles the region of the lever body 52 beneath the fulcrum or rivet 62.

One of the side walls 101 of the U-shaped configuration of supplemental lever 100 is integrally formed with an extension 106 which is articulately connected with an extension or arm 108 formed as a continuation of wall 94 of the clutch control member or means 92. As particularly shown in Figures 6 and 7, the arm 108 is formed with a slot 110 which accommodates a rivet 112 carried by the upper end of the extension 106 formed on the supplemental lever 100. Through this arrangement pivotal movement of the supplemental lever 100 about its fulcrum 102 causes pivotal movement of the clutch control member 92 about its fulcrum or support 83 to control the clutch member or roller 87.

Resilient means is provided for normally biasing the clutch control member 92 into a position to urge the clutch member 87 into clutching engagement with the block 89 and the upper arcuate surface 78 of the bar 74 for holding the lever construction 50 in brake setting position. In the embodiment illustrated, the resilient means is effective upon the supplemental lever 100, the biasing force being transmitted to the member 92 through the articulate connected provided by the rivet 112 and slot 110.

As shown in Figures 2, 5 and 6, the upper flange portions 57 of the lever body 52 are formed with an opening to accommodate a cup-like member 114, the open end of which is formed with a circular flange 115 engageable with the upper surface of the lever body as shown in Figure 5 to position the cup 114 in the lever body.

Disposed within the cup 114 is an expansive coil spring 116 which is disposed between the bottom wall 117 of the cup 114 and the inner surface of the bight portion of the supplemental lever 100 as shown in Figure 5 to bias the supplemental lever 100 in a counterclockwise direction about its fulcrum 102 as viewed in Figures 1, 2 and 6.

This bias is transmitted through the pin and slot connection 110, 112 urging the clutch control member 92 in a clockwise direction about is fulcrum or support 83 as viewed in Figures 1 and 6. This bias directs the clutch roller 87 into wedging engagement between the block 89 and the upper curved surface 78 of bar 74 so as to effectively hold the lever construction 50 in a brake setting position.

In the embodiment illustrated in Figures 1 through 7, a single means is provided connected with the lever body 52 and the supplemental lever 100 for performing the dual purposes or functions of facilitating the setting of the brake mechanism by pivotal movement of the lever body 52 about its fulcrum and, through articulate movement of the single means, to effect a release of the clutch roller 87 to release the lever 52 and the brake mechanism. The lower extremities of the side walls of components 54 and 55 of the lever body 52 are formed with extensions 120.

The extensions 120 are provided with aligned openings to accommodate a rivet 122. In the embodiment illustrated, the single means for setting and releasing the lever construction is in the form of a U-shaped member 124 to which is secured a food pad portion, plate or element 126.

As shown in Figure 4, the pad 126 formed of metal is welded as at 129 to the bight portion of the member 124. The parallel walls of U-shaped member 124 are formed with openings through which extends the rivet or stub shaft 122 whereby the member 124 is articulately or pivotally supported upon or connected with the extensions 120 formed on the lever body 52.

The parallel walls 101 of the supplemental lever 100 are formed with integral extensions 125 disposed within and adjacent the walls or leg portions of member 124, the parallel walls of member 124 and the extensions 125 being formed with aligned slots 127 to receive a rivet or stub shaft 128 whereby member 124 is pivoted or articulately connected with the supplemental lever 100. The metal pad 126 is preferably covered with a pad 130 of rubber or other non-metallic material to receive the foot of the vehicle operator.

From the foregoing, it will be seen that the foot receiving unit comprising the metal pad 126, U-shaped member 124 and the rubber covering or pad 130 forms a single means articulately connected with both the brake actuating lever 52 and the releasing mechanism for the brake retaining means or clutch member 87.

The operation of the mechanism control of the invention as illustrated in Figures 1 through 7 is as follows: When the vehicle operator desires to set the parking or emergency brakes of the vehicle, he exerts foot pressure upon the pad 126 in the general direction of the arrow A shown in Figure 2. The force is applied in the region of the stub shaft or rivet 122 whereby the applied pressure is effective to swing the lever body 52 about the fulcrum or shaft 62 in a clockwise direction as viewed in Figures 1, 2 and 6 exerting an upward pull upon the cable 38 and thereby effectively setting the brakes.

The biasing pressure of the expansive coil spring 116 is transmitted through the supplemental lever 100 to the clutch control member 92, urging the latter in a clockwise direction about its pivotal support 83 as viewed in Figures 1 and 6 biasing the clutch roller 87 into wedging engagement between the block 89 and the bar 74. Upon release of foot pressure from the pad 130, the clutch roller remains wedged between block 89 and bar 74 to hold the lever construction 50 and the brake cable 38 in brake set position.

When the vehicle operator desires to release the brake mechanism, foot pressure is applied to the pad 126 in the general direction of the arrow B shown in Figure 2, which pressure swings or tilts the member 124 about the axis of the rivet 122 in a clockwise direction as viewed in Figures 1, 2 and 6, swinging the supplemental lever 100 in a clockwise direction about its pivotal support 102 and through the pin and slot connection 110, 112 with clutch control member 92, the latter is swung in a counterclockwise direction as viewed in Figures 1 and 6.

The clutch roller 87 is thus moved out of frictional or clutching engagement between the block 89 and the bar 74, thus releasing the lever construction 50 which moves to brake release position under the influence of spring 36 shown in Figure 1 and the conventional springs (not shown) associated with the brake shoes of the vehicle brake mechanism. A shock absorbing member 90 of rubber carried by the lever body 52 engages a flange 91 formed on the support 45 to cushion return movement of the lever to brake-release position.

The application of foot pressure in the general direction of the arrow B shown in Figure 2 on the pad 126 in the region of the rivet or stub shaft 128 tilts or swings the member 124 and pad 126 about the axis of rivet 122 as a fulcrum to cause movement of supplemental lever 100 and effect release of the clutch member 87. The shifting of the application of force in the directions of arrows A and B does not necessitate a repositioning of the operator's foot on the pad 126 as the change in the direction of the force may be accomplished by the operator simply rocking his foot on the pad 126 depending upon whether the brake is to be set by application of force in the direction of the vector A or the clutch 87 to be released by the application of force in the direction of the vector B. Thus through the arrangement of the invention herein described, the emergency or parking brakes of a vehicle may be set and released through the application of foot pressure properly applied to a single foot actuated means or member.

Figures 8 through 11 illustrate a modified arrangement of mounting of the foot-operated brake setting and releasing member or unit and its articulate connections with the main lever and the supplemental lever. In this form of construction, the lever body 52' is substantially of the same construction and configuration as lever body 52 except that the box-like section such as that shown in Figure 5 is continued to the end of the lever body 52' as shown in Figures 8 and 11. The supplemental lever 100' is of substantially the same construction as supplemental lever 100 except that the end region 135 of the supplemental lever does not overlap the end region 134 of the lever body 52'.

A foot-operated member 140 is inclusive of a metal pad portion 126' which is adapted to be covered by a rubber pad 130', the arrangement including a U-shaped member 142 which is welded as at 143 to the pad portion or plate 126'. The parallel walls of the U-shaped member 142 and adjacent side walls of the lever body 52' are provided with aligned openings to accommodate a rivet or stub shaft 144 whereby member 142 is articulately connected or fulcrumed upon the lever body 52' through the medium of the rivet 144. The foot pad 140 is therefore tiltable about the axis of the rivet or shaft 144.

The end regions of the side wall portions 135 of the supplemental lever 101' are formed with aligned slots 146 which are in registration with openings formed in the parallel walls of member 142, the slots and openings accommodating a rivet or stub shaft 148 which serves to establish an articulate pin and slot connection between the foot pad member 140 and the supplemental lever 101'. Thus tilting movement of the pad member 140 about the axis of the rivet 144 in a counterclockwise direction as viewed in Figure 11 swings the supplemental lever 101' about its fulcrum 102' to effect a release of the clutch roller 87 in the manner hereinbefore described in reference to the form of construction shown in Figures 1 through 7.

In the operation of the form of construction shown in Figures 8 through 11, the operator, in setting the brake mechanism, exerts foot pressure upon the pad means 140 in the general direction of the arrow or vector C in the region of the rivet or stub shaft 144. Thus pressure applied in the direction of the arrow C swings the lever body 52' about the axis of its fulcrum to set the vehicle parking brakes in the manner hereinbefore described in connection with the form shown in Figures 1 through 7.

When the operator desires to release the lever retaining means or clutch 87, foot pressure is shifted to the direction of the arrow or vector D in the region of the stub shaft 148. Pressure in the direction of the arrow D causes a tilting or swinging movement of the foot pad unit 140 in a counterclockwise direction about the axis of the fulcrum or rivet 144 causing a swinging movement of the supplemental lever 101' in a clockwise direction about the axis of its fulcrum 102' and, through the connection of the supplemental lever with the clutch control member 92, the clutch roller 87 is moved to lever releasing position.

The position of the pad 126' in clutch release position is indicated in dotted lines at 126" in Figure 8. It should be noted in both forms of construction herein described that the setting of the brake mechanism and the releasing of the mechanism is accomplished by foot pressure applied to a single means or unit and the two functions or actions may be accomplished simply by shifting the direction of pressure applied to the foot pad unit.

Figures 12 and 13 illustrate a lever construction embodying a modified form of foot-actuated, clutch releasing means. In this form of construction, the lever body 52" is fulcrumed upon the support 45 by means of a rivet or stub shaft 62". An arcuately-shaped arm 74" is pivotally secured in a generally circular socket formed in the support 45, the arm being held against lateral displacement by means of discs 75" which receive a rivet 76".

Disposed between the side walls of the lever components or sections 54" and 55" is a lever retaining means or clutch 87" preferably of the roller type as shown in Figures 12 and 13. The clutch roller 87" is arranged for cooperation with a clutching surface of a rectangular block 89" and the upper surface 78" of the curved bar 74". Disposed beneath the curved bar 74" and arranged between the side walls of the lever body components 54" and 55" is an abutment sleeve or bushing 155 which is journally supported upon a rivet or stub shaft 157.

The lever body 52" is adapted to be connected to the vehicle parking or emergency brakes by means of a clevis of the character shown at 69 in Figure 6 which is connected with the lever by a rivet (not shown) extending through openings in projections 66' formed upon the lever body. The clutch roller 87" is adapted for wedging engagement between the rectangular block 89" and the arcuate or curved bar 74" to hold the lever or lever body 52" in brake-setting position.

In this form of construction, a supplemental lever or member 160 is provided having operative connection with the clutch roller 87" for controlling the position of the clutch roller to effect a release of the lever from brake-setting positions. The supplemental lever 160 is preferably formed of sheet metal of U-shaped configuration in cross-section and is pivotally or articulately supported upon the stub shaft or rivet 62" which also forms the fulcrum for the lever 52" as shown in Figures 12 and 13.

The clutch roller 87" is formed with tenons 98" which are received in open-ended slots 162 formed in the upper end regions of the side walls 164 and 165 of the supplemental lever 160. It will be apparent that pivotal movement of the supplemental lever 160 about the fulcrum 62" moves the clutch roller 87" into and away from lever retaining position.

Disposed adjacent the lower end of the lever or lever body 52" is a single foot operated means or unit for setting the brakes by moving the lever 52" about its fulcrum 62" and for releasing the clutch means 87" through relative movement of the supplemental lever 160. As shown in Figure 12, a U-shaped member 170 which is similar to the U-shaped member 142 shown in Figure 11 is articulately or pivotally supported upon the end region of the lever body 52" through the medium of a rivet or stub shaft 72. Welded or otherwise secured to the U-shaped member 170 is a foot receiving plate 174 which may be covered with a rubber pad or covering (not shown).

The foot operated means 170, 174 is operatively connected with the supplemental lever 160. The lower end regions of the side walls of supplemental lever 160 are formed with slots 176 through which extends a rivet or stub shaft 178, the latter also projecting through openings in the parallel walls of the U-shaped member 170 whereby an articulate or operative connection is established between the foot operated means and the supplemental lever 160. Thus the foot operated means or unit 170, 174 has articulate or operative connection with both the main lever or lever body 52" and the supplemental lever 160.

Resilient means is provided for normally biasing the supplemental lever 160 in a clockwise direction as viewed in Figure 12 to urge the clutch roller 87" into clutching engagement with the block 89" and the curved bar 74". Mounted in an opening in a web portion 179 of the main lever 52" is a sheet metal metal cup 180 formed with a flange 181 for properly positioning the cup with respect to the main lever. Disposed within the cup 180 and a bight portion 182 of the supplemental lever 160 is an expansive coil spring 184 as shown in Figure 12 which urges the supplemental lever in a direction to move the clutch 87" toward clutching position.

The operation of the form of construction shown in Figures 12 and 13 is as follows: When the vehicle operator desires to set the parking or emergency brakes of a vehicle, he exerts foot pressure in the direction of the arrow E shown in Figure 12 in the region or in the direction toward the stub shaft 172 which establishes a fulcrum or pivotal connection between the foot operated means 170 and the main lever or lever body 52". This pressure swings the lever 52" and the components carried thereby and the supplemental lever 160 in a clockwise direction as viewed in Figure 12 which effects a setting of the brakes through the cable and clevis connection of the character shown in the form of construction illustrated in Figure 1 to actuate the vehicle brakes.

When the lever reaches a brake-setting position, the expansive spring 184, biasing the supplemental lever 160 in a clockwise direction about its fulcrum 62", urges the lever retaining means or clutch roller 87" into wedging or clutching engagement with the block 89" and the bar 74" to hold the main lever in brake-setting position.

When the operator desires to effect a release of the brakes and hence a release of the lever retaining means or roller 87", the operator exerts pressure in the direction of the arrow F shown in Figure 12. Foot pressure applied in this manner to the foot operated means 170, 174 causes a tilting or swinging movement of the foot operated means in a clockwise direction about the stub shaft 172 as a fulcrum. This tilting movement is transmitted through the pin and slot connection 178, 176 to the supplemental lever or clutch controlling means 160, swinging the supplemental lever 160 in a counterclockwise direction as viewed in Figure 12, thus moving the clutch roller 87" out of frictional, wedging or locking engagement with the block 89" and the curved bar 74" whereby the main lever 52", under the influence of the brake return spring or springs, is moved in a counterclockwise direction about the fulcrum 62" to brake released position.

It is apparent that, within the scope of the invention, modifications and different arrangements may be made other than is herein disclosed, and the present disclosure is illustrative merely, the invention comprehending all variations thereof.

I claim:

1. Apparatus for actuating the parking brakes of a vehicle including, in combination, a support, a foot-operated lever articulately mounted intermediate its ends on the support, means adapted to connect the lever with the vehicle parking brakes, detent means associated with the lever for retaining the lever in brake-setting positions, means for controlling the lever retaining means including an element pivotally supported on the lever, a foot operated member, said member being mounted on said lever for movement relative thereto, and a second lever establishing operative connection of said foot operated member with the element controlling the detent means whereby movement of the member relative to the lever effects a release of the detent means.

2. Apparatus for actuating the parking brakes of a vehicle including, in combination, a support, a brake-setting lever pivotally mounted intermediate its ends on the support, means adapted to connect the lever with the vehicle parking brakes, detent means movable with the brake setting lever adapted to retain the lever in brake-setting positions, an element mounted for pivotal movement relative to the lever for controlling said detent means, a foot operated member articulately connected with the brake-setting lever, a supplemental lever pivotally supported on the brake-setting lever and having operative connection with said element, said foot operated member having operative engagement with said supplemental lever whereby pivotal movement of said member relative to the brake-setting lever effects a release of the detent means.

3. Apparatus of the character disclosed including in combination, a support, a main lever fulcrumed on the support, means arranged to connect the main lever with mechanism to be controlled thereby, means including a roller arranged for cooperation with said main lever and support for retaining the main lever in adjusted positions, means including an arm articulately mounted on the main lever and adapted for engagement with the roller for controlling the same, a pivotally-supported supplemental lever articulately supported on the main lever and having operaitve connection wtih said arm, and a foot operated member articulately connected with the main lever and arranged for engagement with the supplemental lever whereby articulate movement of said member actuates the supplemental lever to effect a release of the roller from lever retaining position, and resilient means normally biasing the roller toward lever retaining position.

4. Mechanism control of the character disclosed, in combination, a support, a main lever fulcrumed on the support, means arranged to connect the main lever with mechanism to be controlled thereby, means for retaining the main lever in adjusted positions including a locking roller, a supplemental lever disposed adjacent the main lever and mounted for pivotal movement relative thereto, said supplemental lever having operative connection with said locking roller, a foot operated member having articulate connection with one of said levers and arranged for engagement with the other of said levers and adapted for movement relative to said levers for effecting release of the locking roller through the supplemental lever, and resilient means normally biasing the locking roller toward lever retaining position.

5. Mechanism control of the character disclosed, in combination, a support, a main lever fulcrumed on the support, means arranged to connect the main lever with mechanism to be controlled thereby, means for retaining the main lever in adjusted positions including a locking roller, a supplemental lever of U-shaped cross-section disposed astraddle the main lever and mounted for pivotal movement relative thereto, said supplemental lever having operative connection with said locking roller, a foot operated member having articulate connection with one of said levers and arranged for engagement with the other of said levers and adapted for movement relative to said levers for effecting release of the locking roller, and resilient means normally biasing the locking roller toward lever retaining position.

6. Mechanism control including, in combination, a support, a foot-operated main lever articulately mounted by the support, means associated with said main lever and said support for retaining the main lever in adjusted positions, means arranged to connect the main lever with mechanism to be controlled, a pivotally supported supplemental lever member, said supplemental lever member having operative connection with said main lever retaining means, said foot-operated main lever and said supplemental lever member having end regions in adjacent relation, a foot pad member articulately connected with the adjacent end regions of the main lever and the supplemental lever member whereby tilting movement of said foot pad member relative to the main lever and supplemental lever member actuates the lever retaining means, and resilient means normally biasing the main lever retaining means toward lever retaining position.

7. Mechanism control including, in combination, a support, a foot-operated main lever articulately mounted by the support, means associated with said main lever and said support for retaining the lever in various positions of adjustment, means adapted to connect the main lever with mechanism to be controlled, means for controlling the lever retaining means including a supplemental lever disposed adjacent the main lever, spring means disposed between the levers for normally biasing the lever retaining means toward lever retaining position, an end region of the supplemental lever being arranged adjacent an end region of the main lever and a foot receiving means operatively engageable with the adjacent end regions of the main and supplemental levers and arranged whereby pressure applied to said foot receiving means in different directions moves the main lever to an adjusted position or effects a release of the lever retaining means.

References Cited in the file of this patent

UNITED STATES PATENTS

| | | |
|---|---|---|
| 669,475 | Bullard | Mar. 5, 1901 |
| 787,530 | McComb | Apr. 18, 1905 |
| 914,277 | Howe | Mar. 2, 1909 |
| 1,014,069 | Lambert | Jan. 9, 1912 |
| 1,238,910 | Henderson | Sept. 4, 1917 |
| 1,443,949 | Fuller | Feb. 6, 1923 |
| 1,532,870 | Blackburn | Apr. 7, 1925 |
| 1,614,289 | Dominguez | Jan. 11, 1927 |
| 2,014,300 | Strobridge | Sept. 10, 1935 |
| 2,141,778 | Wenn | Dec. 27, 1938 |
| 2,309,454 | Heller | Jan. 26, 1943 |
| 2,587,725 | Hinsey | Mar. 4, 1952 |
| 2,781,117 | McLeod | Feb. 12, 1957 |